June 9, 1942.  P. E. PEARSON  2,285,872
SOLDER FEEDER
Filed Dec. 5, 1938  6 Sheets-Sheet 1

Inventor
Paul E. Pearson
By Mason & Porter
Attorneys

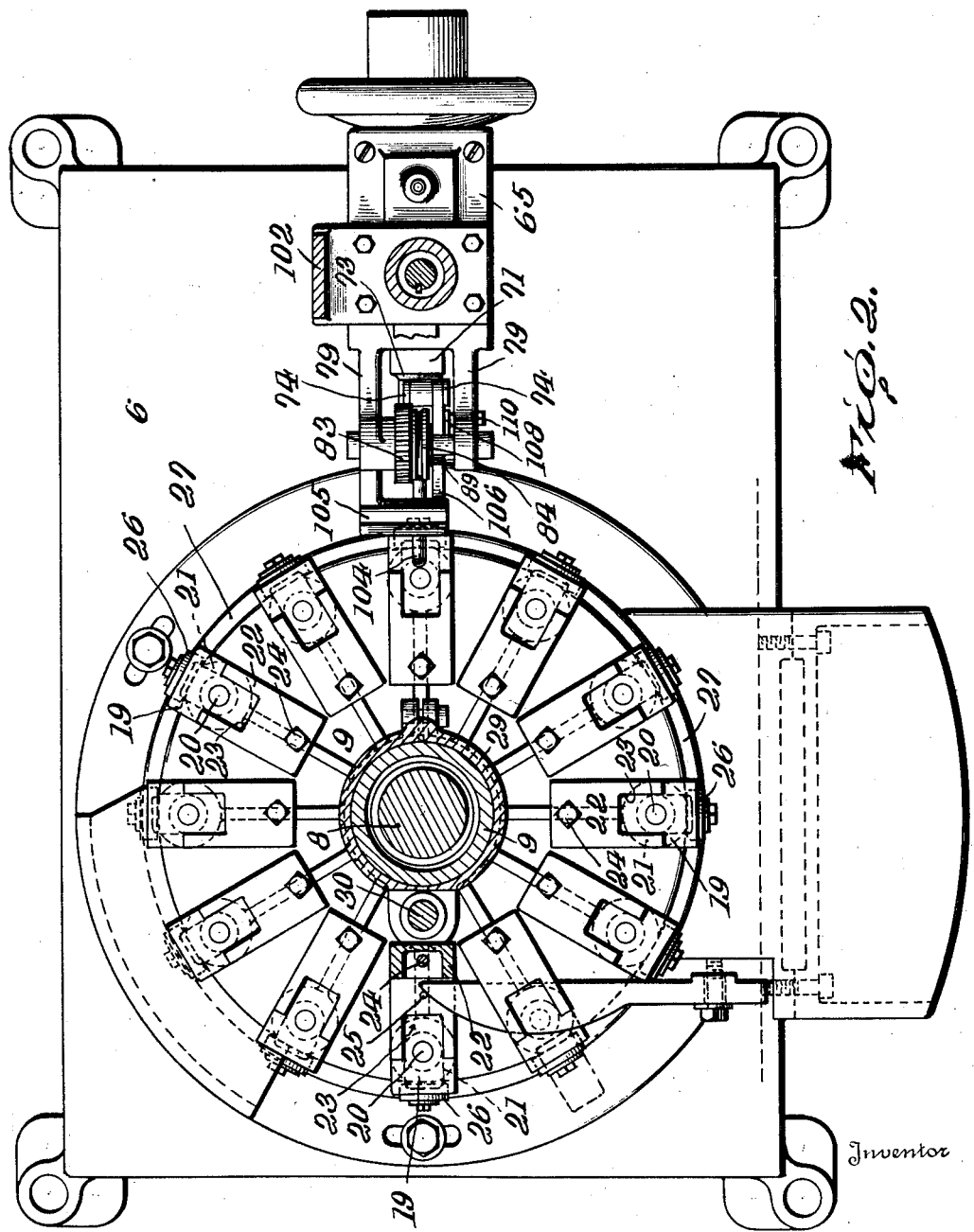

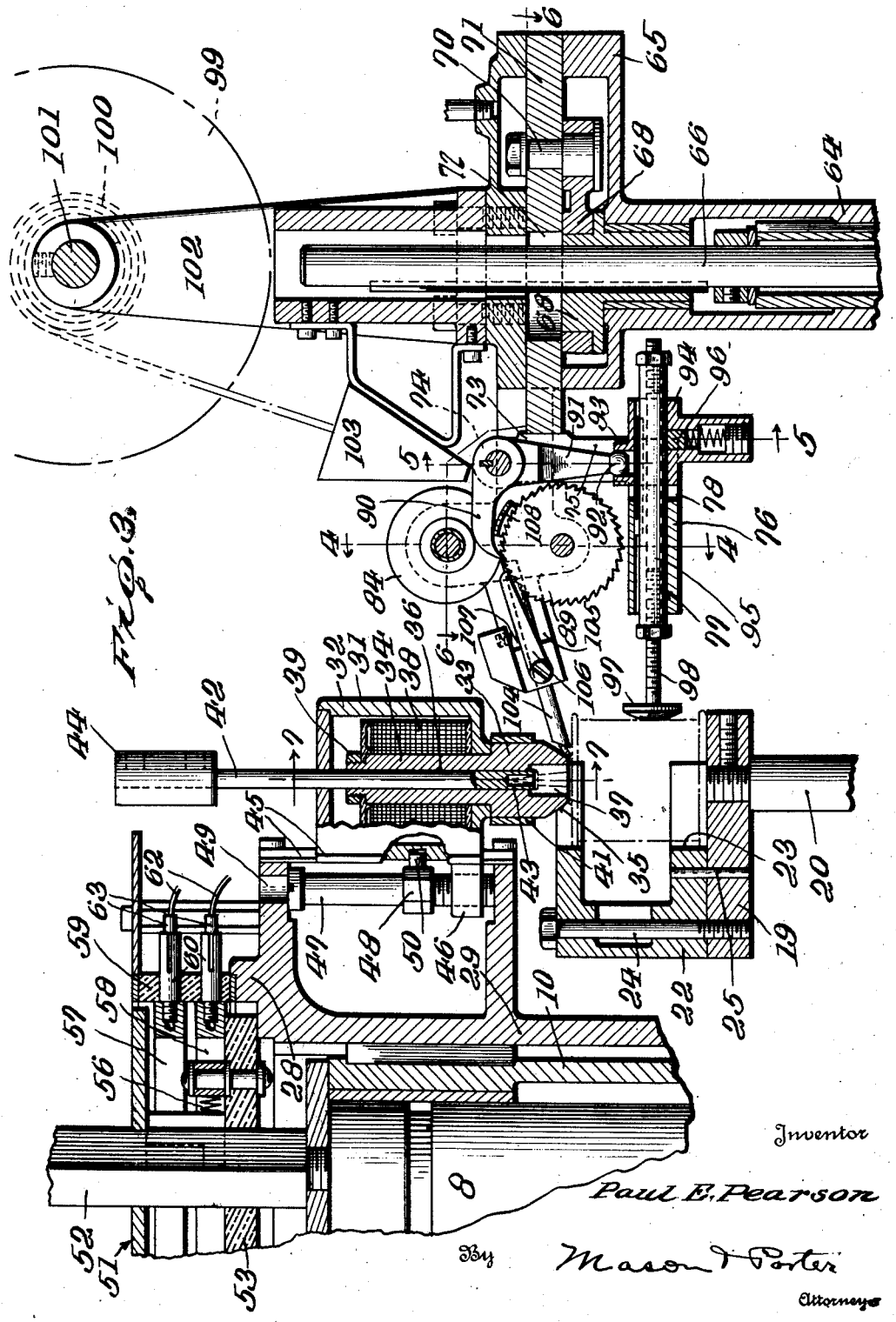

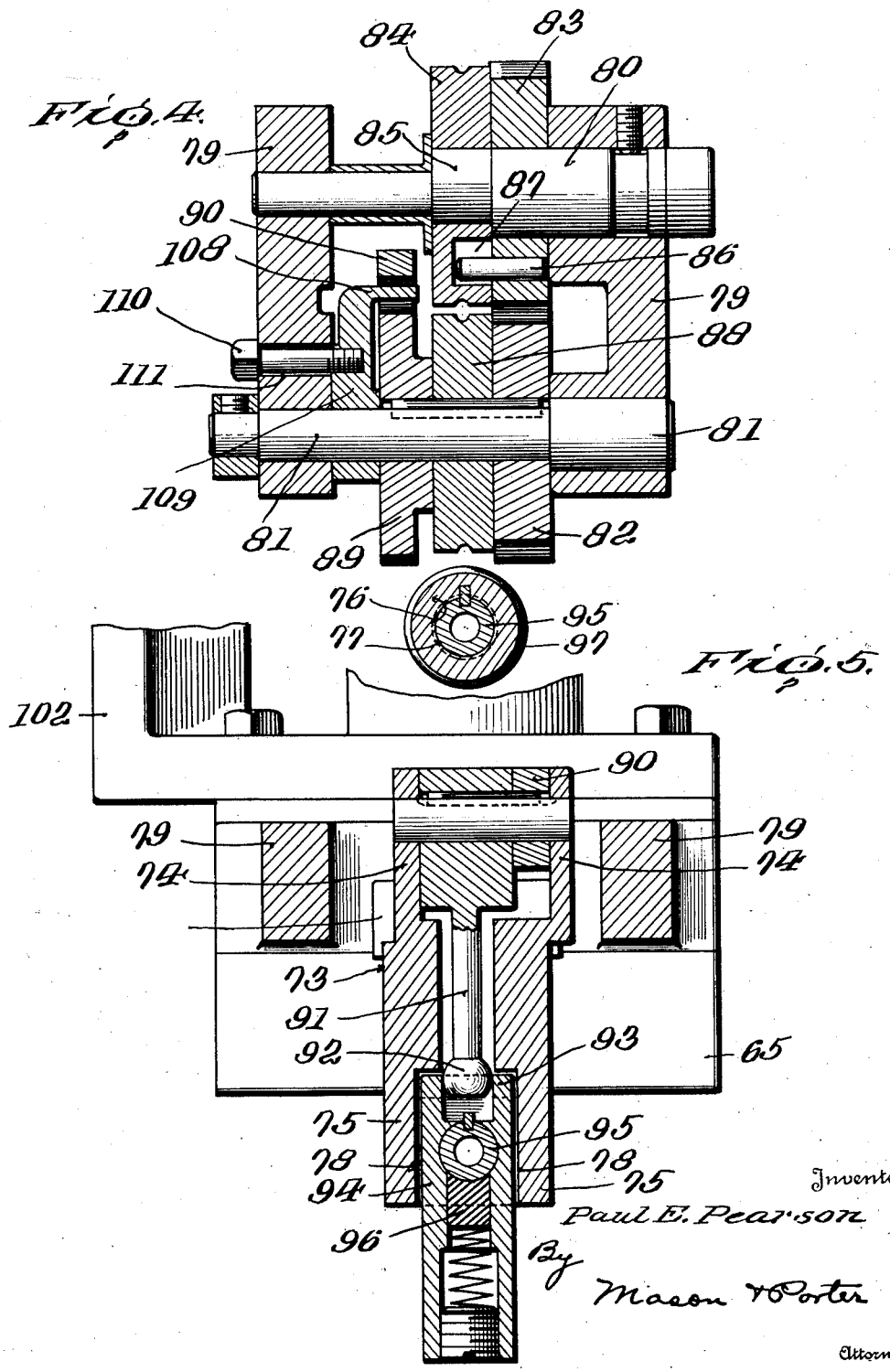

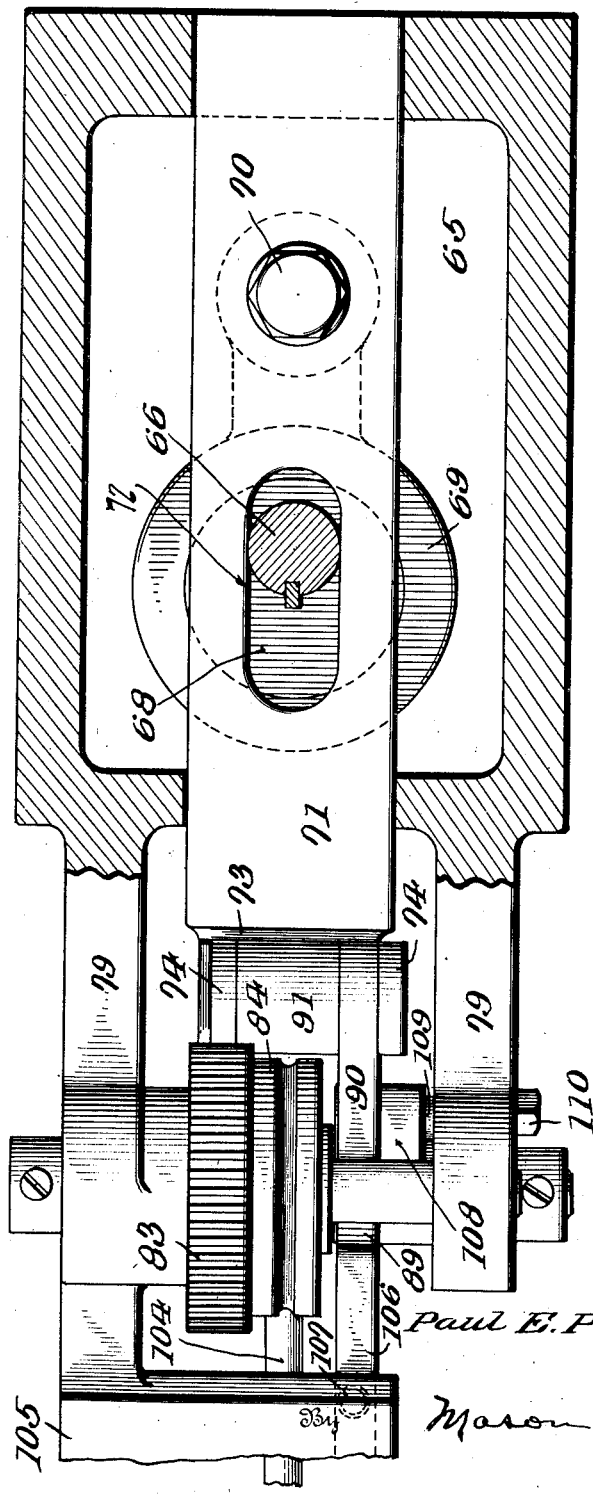

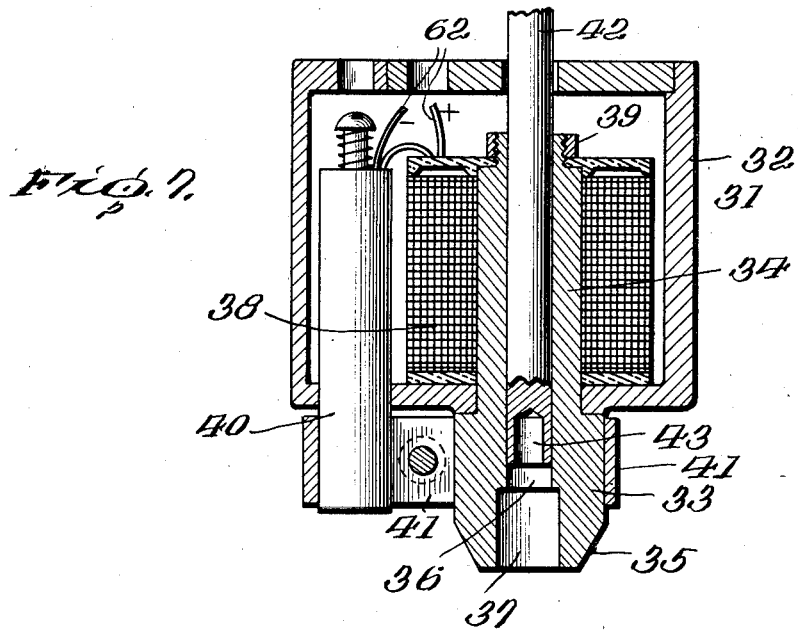
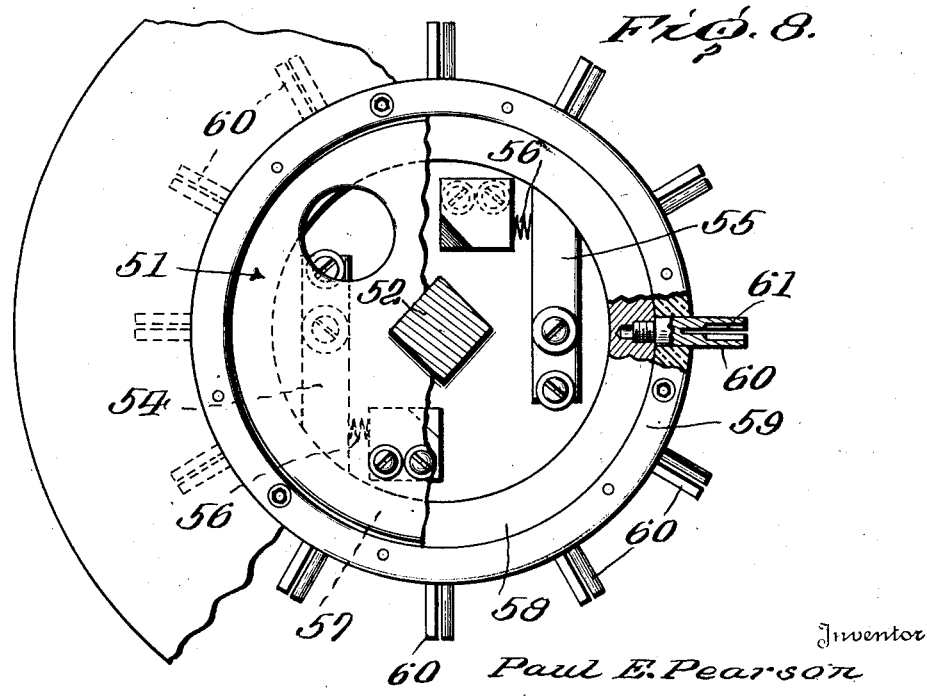

Patented June 9, 1942

2,285,872

UNITED STATES PATENT OFFICE 2,285,872

SOLDER FEEDER

Paul E. Pearson, Chicago, Ill., assignor to Continental Can Company, Inc., New York, N. Y., a corporation of New York Application December 5, 1938, Serial No. 244,085

15 Claims. (Cl. 113—94)

The invention relates generally to soldering machines and primarily seeks to provide certain new and useful improvements in solder feeders.

An object of the invention is to provide a novel solder feeding means effective for feeding a predetermined amount of solder against a heated iron at the soldering station only when a can is presented at that station.

Another object of the invention is to provide a solder feeding means of the character stated including coacting solder strip feeding rolls, a ratchet member fixed to one roll, a roll actuating pawl normally out of contact with the ratchet, and means mechanically moved back and forth into and out of contact with a can positioned for having the spout thereof soldered and actuated by engagement with the can to move the pawl into effective engagement with the ratchet for imparting roll turning movement thereto.

Another object of the invention is to provide a solder feeding means of the character stated in which the pawl moves back and forth with a mechanically reciprocated slide member and in which there is included a rod movable with and slidable relative to the slide member and disposed in position for having movement thereof arrested by contact with a can arranged for a soldering operation, and means including a pawl positioning element slidable on and yieldably-frictionally engaging the rod and effective to cause the pawl to engage with the ratchet and effect an actuation of the solder feeding means through arresting of the movement of the rod by the can to be soldered and continued movement of the pawl and slide member.

With the above and other objects in view that will hereinafter appear, the nature of the invention will be more clearly understood by following the detailed description, the appended claims, and the several views illustrated in the accompanying drawings.

In the drawings:

Figure 2 is a horizontal section taken on the line 2—2 on Fig. 1.

Figure 3 is an enlarged fragmentary vertical section illustrating the solder feeding means, one can holder and one soldering iron also being shown.

Figure 4 is a detail vertical cross-section taken on the line 4—4 on Fig. 3.

Figure 5 is a detail vertical cross-section taken on the line 5—5 on Fig. 3.

Figure 6 is a detail horizontal section taken on the line 6—6 on Fig. 3.

Figure 7 is a detail vertical cross-section taken on the line 7—7 on Fig. 3.

Figure 8 is a horizontal section taken on the line 8—8 on Fig. 1.

Figure 1:
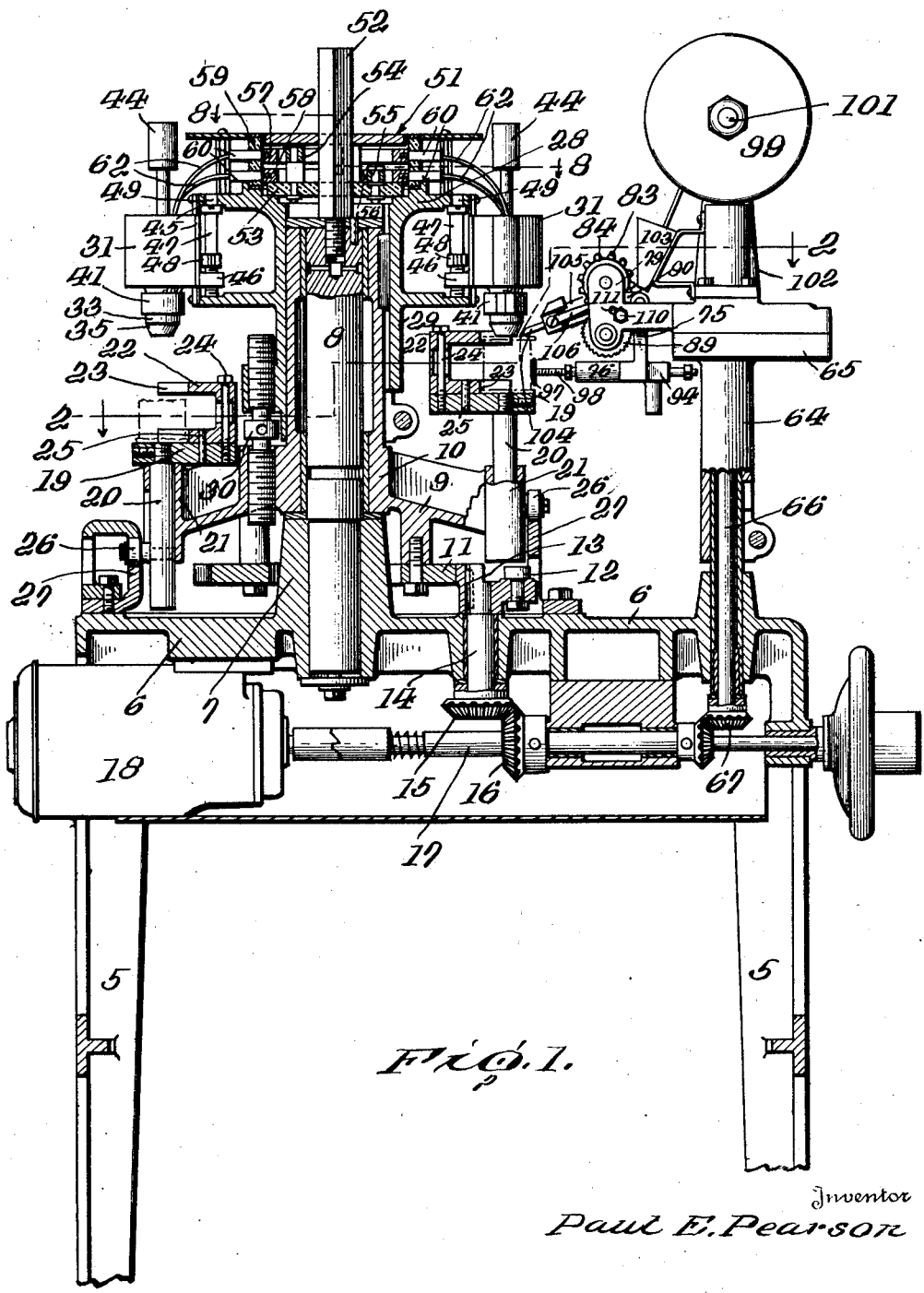
Figure 1 is a vertical section of the machine taken through the axis of the turrets and the soldering station.

The machine herein disclosed as illustrative of one practical embodiment of the invention includes a supporting frame 5 having a table top 6 formed with an upstanding bearing sleeve 7.

A shaft 8 is secured within the sleeve 7 and rotatably supports a turret 9 having an upstanding bearing sleeve 10. The turret 9 is indexed station by station about the shaft 8 through the medium of a Geneva gearing equipment. This equipment includes a Geneva wheel 11 actuated by a rotative advancing element 12 and lock 13, the parts 12, 13 being secured to a shaft 14 which is driven through bevel gears 15 and 16 from a main drive shaft 17 connected to a source of power such as an electric motor 18 preferably secured to the frame top 6.

The turret 9 is provided with a plurality of equidistantly spaced can supports, each including a base 19 mounted on a stem 20 vertically slidable in a bearing sleeve 21 carried by the turret. Each base 19 carries a can holding and aligning member 22 provided with upper and lower U-shaped arms providing can aligning recesses 23 and is secured to the base by a single long screw 24. Each member 22 is restrained from angular movement about its securing screw 24 by a pin 25 recessed into the base 19.

The can supports are adapted to be raised into and lowered from can soldering position through the medium of cam follower rollers 26 which engage a cylindrical plate cam 27 having a point of maximum lift disposed in alignment with the can soldering station, and a point of minimum lift just preceding the can discharge station.

An upper turret 28, vertically spaced above the turret 9 and having a depending sleeve 29, is slidably mounted on the sleeve 10 and is splined thereto. The spaced relation of the turrets 9 and 28 can be varied at will through the medium of a turnbuckle screw 30 disposed between the turrets and threadably engaging the respective sleeves thereof.

The upper turret 28 carries a plurality of equidistantly spaced soldering iron assemblies 31 which are disposed in vertical alignment with the can supports. Each soldering iron assembly includes a hollow casing 32 and a soldering iron 33 having a shank 34 of reduced diameter. The soldering iron is provided with a coniform nose 35 and an axially disposed spout-receiving and aligning bore 36 having a counterbore 37 at its lower end.

The shank 34 of the iron extends into the casing chamber and is embraced by an electrical heating unit 38 secured thereto by a clamping nut 39 threadably engaged with the shank. A thermostat control unit 40 of any suitable type is provided for maintaining a definite temperature in each iron, and is disposed to one side of the respective heating unit 38 and has its lower end projecting below the bottom of the casing 32. A clamp 41 formed of heat conducting metal joins the lower end of each thermostat with the respective iron 33 to thereby provide for a flow of heat from the iron to the thermostat and to maintain the thermostat in position, as shown in Figure 7.

Can spout stripping means are provided in each soldering iron assembly and each said means includes a rod 42 slidably mounted in the respective iron bore 36 and having a short bore 43 for receiving the upper end of a can spout. The upper end of each rod supports a weight 44 which causes the rod to gravitate in a manner serving to strip the spout from the bore 36 after the soldering operation is completed.

Each soldering iron assembly 31 is slidably mounted on the turret 28, as at 45, for limited vertical adjustment. Each casing 32 is provided near its lower end with an inwardly extending lug 46. A vertically disposed captive screw 47, having a nut 48 secured thereon, is threadably engaged with each lug 46, and an opening 49 in the top of the turret over each screw 47 enables the insertion of a screw-driver for manipulating the screws. A leaf spring 50 is secured to each casing 32 and engages the respective nut 48 for yieldably retaining the elevating screw against rotation.

In order that electricity can be supplied to the soldering iron assemblies when the apparatus is in operation, a contact ring assembly 51 is provided which permits a flow of electricity from the stationary portion of the machine to the rotating portion. The contact assembly 51 includes a squared stud 52 secured to the shaft 8 and extending upwardly therefrom. A disk 53 is mounted on the stud 52 and supports a pair of pivotally mounted metal contacts 54, 55. The contact 55 is disposed in a plane above that of the contact 54. The contacts 54, 55 are yieldably urged, as by springs 56, into individual contact with the respective upper and lower metallic contact rings 57, 58 which are in turn secured to the inner periphery of an annulus 59 formed from non-conducting material and secured to the upper turret 28. A plurality of upper and lower contact sockets 60, 61 are radially disposed around the annulus and serve as means for conducting current from the contact rings to the exterior of the annulus. Electrical conductors 62 having plug connections 63 with the sockets 60, 61 lead to the heating and control elements of the soldering iron assemblies 31, the thermostat units 40 being connected in series with the respective iron heating elements in the manner illustrated in Figure 7. Electricity is supplied by suitable conductors attached to the contacts 54, 55. See Figure 8.

The mechanism for feeding predetermined amounts of solder to the irons as they are presented at the soldering station by the turret structure, carrying them in suitable superposed relation with the cans and assembled spouts, is disposed to one side of the turret structure assembly and includes a vertically extending telescopic shaft casing 64 terminating at its upper end in a chamber forming casing enlargement 65. A shaft 66 is journaled in the casing and carries a bevel gear 67 secured at its lower end which meshes with a similar gear on the main drive shaft 17. An eccentric 68 is keyed to the shaft 66 and is located adjacent the bottom of the chamber 65.

The eccentric 68 rotates in a pitman strap 69 having a driving pin 70 extending upwardly therefrom. A slide plate 71 having a clearance slot 72 surrounding the shaft 66 is superposed upon the eccentric and pitman strap and pivotally connected to the pin 70. The slide plate has its ends extending through guide openings in the casing enlargement 65 and is adapted to be reciprocated toward and from the turret structure through the medium of the eccentric and strap connections 68, 69, and the driving pin 70. The rotary movement of the shaft 66 is thus transmitted in the form of rectilinear movement to the slide plate 71.

The end of the slide plate 71 which is nearest the turrets is provided with a yoke 73 having spaced upstanding arms 74, 74, and spaced depending arms 75, 75 joined at their lower ends by a casing 76 extending horizontally toward the turrets and having an axial bore 77 in the portion thereof nearest the turrets, and a vertical slot 78 in the end thereof remote from the turrets, see Figure 5.

The shaft casing portion 65 is provided adjacent its upper end with a pair of spaced parallel arms 79, 79 extending toward the turret assembly and spanning the slide plate 71. Vertically spaced upper and lower horizontal shafts 80, 81 are secured near the ends of the arms 79, 79 and extend therebetween. The upper shaft 80 is fixed in the arms 79, 79, and the lower shaft 81 is freely rotatable in the arms 79 and has a pinion gear 82 keyed to it and disposed adjacent one arm 79. The gear 82 engages a similar gear 83 journaled on the fixedly mounted shaft 80. An upper solder feed roller 84 is journaled on an eccentric portion 85 of the fixedly mounted upper shaft. The solder feed roller 84 is adapted to be driven by the gear 83 through the medium of a pin 86 having a tight fit in the gear 83 and a sliding fit in a radially disposed slot 87 formed in the opposed face of the roller 84. A similar solder feed roller 88 is keyed to the lower shaft 81 and is disposed in cooperative relation to the upper feed roller 84.

The actuating mechanism for the gears and related feed rollers comprises a ratchet wheel 89 keyed to the lower shaft 81 and disposed adjacent the lower feed roller, and a bell crank ratchet feed lever or pawl 90 pivoted at one end between the upper arms 74, 74 of the plate yoke 73. The pawl member 90 includes a downwardly extending arm 91 terminating at its lower end in a ball knuckle 92. The knuckle 92 is movable in a socket 93 formed in a slide member 94 which is frictionally retained on a slide rod 95 through the medium of a spring-pressed friction element 96. The member 95 is disposed within the bore 77 of the casing 76, and the slide member 94 is disposed within the vertical slot 78 formed in said casing. The slide rod 95 is provided with a can-contacting head 97 having a shank 98 threadably engaged in the slide and extend axially towards the turrets. The rod 95 may be non-circular or formed so as to present a non-circular portion within the casing 76 and within the slide member 94, in both of which it is slidable, but it is preferred that this rod be provided with a key or spline which is slidable in receiving grooves in the elements 76 and 94 in the manner clearly illustrated in Figures 3 and 5 of the drawings.

A reel 99, containing a coil of solder 100, is journaled on a shaft 101 secured to a standard 102 extending upwardly from the casing 65. The solder strip is led downwardly through a rigidly mounted feed cone 103 and between the feed rollers 84, 88. As the solder is fed by the feed rollers, it passes into and through a delivery tube 104 secured to an extension 105 on one of the arms 79.

A pawl 106 is provided and has one end pivotally secured to the extension 105 and its other end engaging the teeth of the ratchet wheel 89, being maintained in yielding engagement with said teeth by a spring 107.

In use, the slide plate 71, the casing 76 and its slide members 94, 95, 97, and the feed pawl 90, are bodily and constantly reciprocated toward and from the turret structure. As the turret assembly is rotated, it serially presents cans and assembled spouts in soldering position at the soldering station. A can positioned at the soldering station will stand in the path of reciprocation of the rod 95, 97 and stop the rod and slide members 97, 95, 94 as they move toward the can, and cause the knuckle 92 to be held in the now stationary socket 93 and the bell crank feed pawl 90, 91 to swing about its pivotal mounting under continued forward movement of the slide plate 71, the ratchet wheel engaging end of said pawl serving to dip into engagement with and thereby rotate the ratchet wheel 89 and feed the solder strip against the then presented soldering iron.

In order that the amount of solder fed between the feed rolls may be regulated, there is provided an arcuate plate 108 overlying the ratchet wheel and which has a downwardly extending portion 109 journaled on the lower shaft 81. Therefore, by pivoting the portion 109 and the arcuate plate about the shaft, the plate may be disposed in varying positions over and partially covering the ratchet wheel. This feed adjusting means can be secured in any desired feed-controlling position by a clamping screw 110 extending through an arcuate slot 111 in the yoke arm. The arcuate plate serves to support the pawl 90 out of contact with the ratchet wheel throughout a selected portion of its stroke (depending on the position of the portion 108) and then allows the pawl to effectively engage the ratchet wheel. The friction grip 96 permits such independent movement between the members 95 and 94 as is necessary during the solder feeding function. It will be obvious that when the contact head 97 does not engage a can there will be no feeding of the solder since the pawl 90 normally partakes of straight line reciprocatory motion, out of contact with the ratchet wheel 89.

In using the herein described apparatus, the spouts are first manually dipped into soldering flux and then applied to the cans to complete the assembly. Then the can and spout assemblies are manually or otherwise fed onto the individual supports from the supporting table and thence serially to and from the soldering station, after which they may be automatically discharged as by an ejecting cam into a receptacle or onto a discharge conveyor provided for the purpose.

The machine herein disclosed may be hand-fed and cam-stripped as stated, or there may be combined with it any suitable form of mechanical feeding and discharging mechanism, an example of which may be found in the United States Letters Patent to Coyle et al. 1,885,992, issued November 1, 1932.

It is of course to be understood that the details of structure and arrangement of parts may be variously changed and modified without departing from the spirit and scope of my invention.

I claim:

1. In a soldering machine, a can support; a soldering iron juxtaposed with a can-to-be-soldered on said support; and means for feeding a predetermined amount of solder to said iron comprising a solder strip supply, a pair of solder strip feeding rolls, means for stationarily supporting said rolls, a supporting member, means for imparting a definite amount of reciprocation to said member, means connecting the rolls in mutual driving relation, a thrust rod slidably supported by said member and engageable with a can stationary on said support, a ratchet wheel movable with one roll, a bell crank pawl pivotally supported by said member and having one end presented for engagement with said wheel, and means frictionally connecting the other end of the bell crank to said rod the arrangement being such that the pawl will ride freely over the wheel when no can is present on the support and be moved into driving relation with the wheel only when a can is present on the support and engaged by said rod.

2. In a soldering machine, a can support, a soldering iron juxtaposed with a can-to-be-soldered on said support, and means for feeding a predetermined amount of solder to said iron comprising a solder strip supply, a pair of solder strip feeding rolls, a strip guide having an outlet adjacent said iron for directing solder strip thereto, a slide, a rod having yieldable connection with the slide so that movement of the rod can be arrested without arresting movement of the slide, means for imparting a definite reciprocation to the slide with the rod moving in a path for being intercepted and having its movement arrested by contact with a can on said support, a roll actuator movable with the slide and engageable at times in feeding contact with a feed roll but normally disposed in an ineffective path of travel, and means operable each time movement of the rod is arrested by contact with a can and as an incident to that contact to place the actuator in roll engaging position so that on continued movement of the slide said actuator will engage and impart a solder strip feeding movement to the rolls.

3. In a soldering machine, a can support, a soldering iron juxtaposed with a can-to-be-soldered on said support, and means for feeding a predetermined amount of solder to said iron comprising a solder strip supply, a pair of solder strip feeding rolls, a strip guide having an outlet adjacent said iron for directing solder strip thereto, a slide, a rod having yieldable connection with the slide so that movement of the rod can be arrested without arresting movement of the slide, means for imparting a definite reciprocation to the slide with the rod moving in a path for being intercepted and having its movement arrested by contact with a can on said support, a roll actuator movable with the slide and engageable at times in feeding contact with a feed roll but normally disposed in an ineffective path of travel, means operable each time movement of the rod is arrested by contact with a can and as an incident to that contact to place the actuator in roll engaging position so that on continued movement of the slide said actuator will engage and impart a solder strip feeding movement to the rolls, and means for rendering a greater or lesser amount of said continued movement of the slide effective for the roll movement imparting purpose so as to enable adjustment of the amount of solder strip fed under control of each can contact.

4. In a machine of the character described, a support for a can, a soldering iron juxtaposed with a can-to-be-soldered on said support, and devices for feeding solder to the iron including a pair of opposed and drive-coupled feed rolls supported on a stationary mounting, a ratchet member fixed to one roll, a roll actuating pawl normally out of contact with said ratchet, and means mechanically moved back and forth into and out of contact with a can on said support and actuated by engagement with the can to move the pawl into effective engagement with said ratchet and impart a roll turning movement to said pawl.

5. In a machine of the character described, a support for a can, a soldering iron juxtaposed with a can-to-be-soldered on said support, and devices for feeding solder to the iron including a pair of opposed and drive-coupled feed rolls supported on a stationary mounting, a ratchet member fixed to one roll, a roll actuating pawl normally out of contact with said ratchet, and means mechanically moved back and forth into and out of contact with a can on said support and actuated by engagement with the can to move the pawl into effective engagement with said ratchet and impart a roll turning movement to said pawl, and means adjustably interposed between said ratchet and the pawl for adjusting the duration of each effective engagement of the pawl with the ratchet and the amount of feed movement which can be imparted to said rolls at each can engagement.

6. In a soldering machine, a can support, a soldering iron juxtaposed with a can-to-be-soldered on said support, and means for feeding a predetermined amount of solder to said iron comprising a solder strip supply, a pair of solder strip feeding rolls, a strip guide having an outlet adjacent said iron for directing solder strip thereto, an element, means for mechanically moving said element into and out of contact with cans on said support, means between said element and said rolls for imparting a definite amount of rotation to said rolls only after pressure contact of the element with a can stationary on said support and assuring against the feeding of solder strip when no can is present on said support, said support having a can centering crotch thereon engageable by a supported can, and said movable element being movable only rectilinearly in a line centered in said crotch so as to assure a centered position of a can during feeding of the solder to the iron.

7. In a machine of the character described, a can support, a soldering iron, and means for intermittently feeding a predetermined amount of solder against the iron comprising a pair of stationarily supported solder feed rolls, means for imparting feed movement to said rolls only when a can is present on said support comprising a slide movable toward and from the can and carrying a ratchet engaging pawl, and a pawl positioning element carried by said slide and movable between and into and out of engagement with spaced stop members for alternately engaging the pawl with and disengaging it from said ratchet, the stop member engaged for effecting engagement of the pawl being the can stationary on said support.

8. In a machine of the character described, a support, solder feeding means mounted on said support, a member reciprocatory rectilinearly relative to said support, means to reciprocate said member, a rod disposed in position for having movement thereof arrested through contact with a can arranged for a soldering operation, means mounting said rod on the reciprocatory member for sliding movement relatively to the member, and means including an actuator element slidable on and yieldably-frictionally engaging said rod and effective to actuate said solder feeding means to supply solder for the aforesaid operation through arresting of the movement of the rod short of its limit in one direction and by said can.

9. In a machine of the character described, a support, solder feeding means mounted on said support, a member reciprocatory rectilinearly relative to said support, means to reciprocate said member, a rod disposed in position for having movement thereof arrested through contact with a can arranged for a soldering operation on said support, means mounting said rod on the reciprocatory member for sliding movement relatively to the member, means including an actuator element slidable on and yieldably-frictionally engaging said rod and ineffective to actuate said solder feeding means in the absence of a can to act as a stop in the path of movement of the rod and effective to actuate said solder feeding means to supply solder for the aforesaid operation through arresting of the movement of the rod short of its normal limit of movement in one direction and by said can.

10. In a machine of the character described, a support, solder feeding means mounted on the support, pawl and ratchet means to actuate the solder feeding means, a reciprocatory member on said support, means to reciprocate said member, a rod disposed in position for having movement thereof arrested through contact with a can arranged for a soldering operation on said support, means mounting said rod on the reciprocatory member for sliding movement relatively thereto, a slide member frictionally connected to the rod, and operatively connected to said pawl and ratchet means for normally holding said pawl out of contact with the ratchet and for causing the pawl to effectively engage the ratchet through arresting of the movement of the rod short of its limit in one direction by said can thereby to cause said rod and slide member to move relative to said reciprocatory member and actuate said solder feeding means to supply solder for the aforesaid operation.

11. In a machine of the character described, a support, solder feeding means mounted on the support including a ratchet, a pawl coacting with said ratchet, a reciprocatory member on said support mounting said pawl, means to reciprocate said member, a rod disposed in position for having movement thereof arrested through contact with a can arranged for a soldering operation, means mounting said rod on the reciprocatory member for sliding movement relatively thereto, a slide member frictionally connected to said rod, and an operative connection from said pawl to said slide for normally holding said pawl out of contact with the ratchet and for causing the pawl to effectively engage the ratchet through arresting of the movement of the rod short of its limit in one direction by said can thereby to cause the rod and slide member to move relative to said reciprocatory member and actuate said solder feeding means to supply solder for the aforesaid operation.

12. Mechanism as defined in claim 11 having means for varying the effective length of the rod for adjusting the point at which movement of said rod will be arrested by contact with a can.

13. Mechanism as defined in claim 11 having means adjustable for varying the time of the engagement of the pawl with the ratchet.

14. In mechanism of the character described, a casing, a slide element mounted and constrained to move rectilinearly by said casing, means in said casing operative to reciprocate said slide element, solder feeding means mounted on said casing and including a ratchet, a pawl pivoted on said slide element to coact with said ratchet, a rod slidably mounted on the slide element disposed in position for having movement thereof arrested through contact with a can arranged for a soldering operation, an actuator member slidable on and frictionally engaging said rod, and an operative connection between said pawl and said member.

15. In mechanism of the character described, a casing, a slide element mounted and constrained to move rectilinearly thereby, an operating shaft within the casing extending through the slide element, means to actuate the slide element through rotation of said shaft, solder feeding mechanism mounted on said casing including a ratchet, a pawl to coact with said ratchet pivoted on said slide element, a casing carried by said slide element and offset from the plane of said slide element, a rod slidably mounted by the second mentioned casing disposed in position for having movement thereof arrested through contact with a can arranged for a soldering operation, an actuator member slidably mounted on said rod and frictionally engaging the rod, and an operative connection from said pawl to said member.

PAUL E. PEARSON.